US010637109B2

(12) United States Patent
Rejman et al.

(10) Patent No.: US 10,637,109 B2
(45) Date of Patent: Apr. 28, 2020

(54) BATTERY PACK INCLUDING CONTACT ARRANGEMENT CONTACTING CLADDING SURFACE OF BATTERY CELL FOR A HANDHELD POWER TOOL

(71) Applicant: Robert Bosch GmbH, Stuttgart (DE)

(72) Inventors: Marcin Rejman, Waiblingen (DE); Thorsten Seidel, Remseck (DE); Christoph Klee, Stuttgart (DE); Mickael Segret, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 62 days.

(21) Appl. No.: 15/554,662

(22) PCT Filed: Mar. 3, 2016

(86) PCT No.: PCT/EP2016/054504
§ 371 (c)(1),
(2) Date: Aug. 30, 2017

(87) PCT Pub. No.: WO2016/142254
PCT Pub. Date: Sep. 15, 2016

(65) Prior Publication Data
US 2018/0040927 A1 Feb. 8, 2018

(30) Foreign Application Priority Data

Mar. 6, 2015 (DE) .......................... 10 2015 204 053
Mar. 2, 2016 (DE) .......................... 10 2016 203 422

(51) Int. Cl.
*H01M 10/48* (2006.01)
*H01M 2/10* (2006.01)
(Continued)

(52) U.S. Cl.
CPC ............. *H01M 10/482* (2013.01); *B25F 5/02* (2013.01); *H01M 2/105* (2013.01);
(Continued)

(58) Field of Classification Search
CPC .. H01M 10/482; H01M 2/105; H01M 2/1055; B25F 5/02
(Continued)

(56) References Cited

U.S. PATENT DOCUMENTS 3,930,889 A * 1/1976 Ruggiero ............ H01M 2/1055
429/97
8,092,932 B2 1/2012 Phillips et al.
(Continued)

FOREIGN PATENT DOCUMENTS

CN 103840221 A 6/2014
EP 2128912 A2 12/2009
(Continued)

OTHER PUBLICATIONS

International Search Report for PCT/EP2016/054504, dated May 13, 2016.

*Primary Examiner* — Sean P Cullen
(74) *Attorney, Agent, or Firm* — Norton Rose Fulbright US LLP; Gerard Messina

(57) ABSTRACT

A battery pack for a handheld power tool, having a cell holder that accommodates at least one battery cell, the battery cell having a cladding surface that runs parallel to a longitudinal axis, the cladding surface being limited by two end faces that run perpendicular to the longitudinal axis, and the cladding surface and the end faces forming an outer shell of the battery cell, and a battery pack electronics. The battery pack electronics includes at least one circuit board having contact elements for producing an electrical connection between the battery pack and the handheld power tool, in addition at least one contact arrangement corresponding to the battery cell is provided, the contact arrangement electrically contacting the corresponding battery cell at the cladding surface.

17 Claims, 8 Drawing Sheets

(51) Int. Cl.
*B25F 5/02* (2006.01)
*H01M 10/42* (2006.01)

(52) U.S. Cl.
CPC ........ *H01M 2/1055* (2013.01); *H01M 10/425* (2013.01); *H01M 10/486* (2013.01); *H01M 2010/4271* (2013.01); *H01M 2220/30* (2013.01)

(58) Field of Classification Search
USPC .......................................... 429/156, 158, 159
See application file for complete search history.

(56) References Cited

U.S. PATENT DOCUMENTS

| | | | |
|---|---|---|---|
| 2006/0164032 A1 | 7/2006 | Johnson et al. | |
| 2006/0275656 A1* | 12/2006 | Feddrix | H01M 2/1055 429/179 |
| 2011/0223458 A1* | 9/2011 | Ferber, Jr. | H01M 2/105 429/99 |
| 2012/0052332 A1 | 3/2012 | Ahn | |
| 2012/0189901 A1* | 7/2012 | Chuang | H01M 2/02 429/158 |
| 2014/0302353 A1* | 10/2014 | Ogura | H01M 2/1055 429/7 |
| 2014/0302369 A1* | 10/2014 | Naito | H01M 2/1055 429/100 |
| 2016/0006014 A1 | 1/2016 | Kolden et al. | |

FOREIGN PATENT DOCUMENTS

| | | |
|---|---|---|
| EP | 2330431 A1 | 6/2011 |
| JP | 2000208118 A | 7/2000 |

\* cited by examiner

BATTERY PACK INCLUDING CONTACT ARRANGEMENT CONTACTING CLADDING SURFACE OF BATTERY CELL FOR A HANDHELD POWER TOOL

FIELD OF THE INVENTION

The present invention relates to a battery pack for a handheld power tool.

BACKGROUND INFORMATION

Because battery-operated devices enable a high degree of flexibility when working, and are in particular independent of mains power and thus enable comfortable working outdoors, for the operation of a handheld power tool the use of battery packs is often provided.

Such battery packs are familiar in principle, and have rechargeable accumulators, usually a plurality of battery cells connected in parallel and/or in series. In the context of the present application, a battery pack is thus to be understood as a packet of batteries which may be made up of a plurality of battery cells that are electrically connected together, capable of storing electrical energy and supplying the energy for the operation of the handheld power tool, and accommodated in exchangeable fashion in a chamber, an interface, or the like of the handheld power tool. The allocation of the battery pack to the handheld power tool takes place by plugging or screwing the battery pack into a complementary socket of the device housing, the battery pack being capable of being coupled to the device housing of the handheld power tool in such a way that during the coupling of the two housings the electric power tool is electrically coupled to the battery pack and is mechanically locked. The electrical contacting generally takes place in the area of the locking device.

The battery cell is connected to the battery pack electronics, and, if there are a plurality of battery cells, these cells are connected on the one hand to one another and on the other hand to the battery pack electronics. Here, for the series connection, in part so-called conductor plates and/or cables are used that are soldered onto the respective complementary poles of a battery cell and that connects these to each other. In the named existing art, it is disadvantageous that the assembly process requires a large outlay, is cost-intensive, and is susceptible to error.

SUMMARY OF THE INVENTION

The object of the present invention is to avoid the disadvantages named above and to provide a battery pack for a handheld power tool in which the series connection of the battery cells among one another, and the assembly of the battery pack, is simplified. In addition, the battery pack is to have good ergonomics and be easy to mount, while being capable of being used as flexibly as possible, being low in cost, and having a simple design.

This object is achieved by a battery pack as described herein. Advantageous embodiments, variants, and developments of the present invention are presented in the further descriptions herein.

According to the present invention, it is provided that a battery pack for a handheld power tool has a cell holder that accommodates at least one battery cell, the battery cell having a cladding surface that runs parallel to a longitudinal axis, the cladding surface being limited by two end faces that stand essentially perpendicular to the longitudinal axis, and the cladding surface and the end faces forming an external shell of the battery cell. On the end faces, in particular the electrical poles, the positive pole and the negative pole, of the battery cell are situated. In addition, the battery pack has a battery pack electronics, the battery pack electronics including at least one circuit board having contact elements for producing an electrical connection between the battery pack and the handheld power tool. According to the present invention, it is provided that in addition at least one contact arrangement corresponding to the battery cell is provided, the contact arrangement electrically contacting the corresponding battery cell at the cladding surface. In this way, an additional contacting of the individual battery cells to the battery pack electronics via a current conductor can be omitted. Here it is particularly advantageous if the contact arrangement is connected to the battery pack electronics via a welded or soldered connection. In this way, a particularly simple mechanical and also electrical contacting is achieved, and in addition such connections are also particularly secure. In addition, through a correspondingly realized welded connection, a tolerance compensation and compensation of thermal expansion can also be achieved.

In a particularly specific embodiment, the battery pack electronics additionally has at least one second circuit board, in particular a flexible one. The in particular flexible circuit board may have a bending rigidity that at least in some regions is realized such that at least in some regions a bending deformation of the flexible circuit board is possible in the mounted state. Here it is advantageous if the bending deformation of the flexible circuit board can take place in such a way that a midplane of the circuit board can be deformed in the region of the bending deformation by an angle φ relative to an original position. In this way, it can be ensured that the flexible circuit board can be variably adapted to the geometrical shape of the battery pack housing or of the cell holder. In addition, a plurality of different electrical components can be positioned on the flexible circuit board that normally are situated at a spatial distance from one another, such as various actuating elements, light displays, voltage taps, temperature sensors, various functional groups of the battery pack electronics, antennas for a radio module, terminals for a wireless charging module, and/or terminals to a charge coil. In this way, the complexity of the cabling and/or the number of soldered connections inside the battery pack housing can be reduced, thus reducing the assembly outlay and thus the costs, and making the battery pack more robust and longer-lived.

Depending on the specific embodiment of the battery cell, it is particularly advantageous if the at least one contact arrangement corresponding to the battery cell is situated on the circuit board or on the second, in particular flexible, circuit board, thus enabling a spatial separation of various contact arrangement. In this way, for example the contact elements for producing an electrical connection between the battery pack and the handheld power tool can be situated on the first circuit board, while the at least one contact arrangement, which electrically contacts a corresponding battery cell, is situated on the second flexible circuit board. In this way, the contacting of the individual battery cells to the battery pack electronics via an additional current conductor can be omitted. In order to achieve such a contacting, the contact arrangement situated on the flexible circuit board can be deformed by the angle φ relative to the original position.

Advantageously, the battery pack electronics has a microcontroller, the microcontroller being electrically connected to the contact arrangement, and being configured to acquire at least one operating parameter of the individual battery cells via the at least one contact arrangement. Using the microcontroller of the battery pack electronics, the charge state can be monitored via the voltage of the individual battery cells, and can be controlled using a corresponding regulation. Correspondingly, a monitoring of individual cells can take place, individual battery cells being connected directly to the circuit board of the battery pack electronics by the contact arrangement. Such a connection can take place for example through a soldered connection, and the battery pack electronics can advantageously have corresponding solder pads. In this way, on the basis of the connection between the battery cells and the circuit board, it can be determined whether all battery cells have been properly charged, or whether a charge current has been reached that the battery cells are not capable of absorbing. In addition, a regulation can be provided by which the charge current can be regulated in such a way that on the one hand an overloading of individual battery cells is prevented, and on the other hand all the battery cells can be completely charged. In this way, over the long term a good capacity of use of the corresponding battery pack is achieved.

In a particular embodiment, the at least one battery cell essentially has no insulating sheath. In an alternative specific embodiment, the at least one battery cell has in some regions an insulating sheath, the insulating sheath may adjoin the end faces and/or the regions of the cladding surfaces. In another alternative specific embodiment, the battery cell has an insulating sheath, the insulating sheath having at least one opening at least in the region in which the contact arrangement contacts the battery cell. As is known from the existing art, the outer shell of the battery cell formed by the cladding surface and the end surfaces is made of an electrically conductive material, in particular a metal, which may be aluminum. For insulation and to avoid short circuits, the outer shell of the battery cell is provided with an insulating sheath, as is also known from the existing art. The insulating sheath surrounds at least the cladding surface of the battery cell essentially completely. The end faces, in particular the poles on the end faces, are exposed in order to enable the electrical contacting of the battery cell. The end faces, in particular the poles on the end faces, essentially have no insulating sheath. Materials that are not electrically conductive, e.g. paper, cardboard, plastic, are suitable for use as insulating sheath. The insulating sheath forms in particular a thin sleeve, lying tightly on the cladding surface, made of for example paper, cardboard, or plastic, e.g. in the form of a shrink tube.

Depending on the specific embodiment of the battery cell, it is particularly advantageous if the contact arrangement is realized in the form of a contact spring and/or a contact blade, in particular an insulation displacement terminal contact. In general, a realization of the contact arrangement as a contact spring, and its mechanical and also electrical coupling to a battery cell, has the advantage that the contact arrangement is mounted so as to yield elastically relative to the battery cells. In this way, an additional resistance to vibration can be achieved, because in particular vibrations such as those that occur in electrical handheld tools, particularly in impact drills or drill hammers, can be compensated.

In a particularly advantageous specific embodiment, the cell holder having the battery cell has corresponding sleeve-type insulating walls, the insulating walls having at least one opening in the regions in which the contact arrangement contacts the battery cell. Here, the cell holder can in particular be made of an injection-molded part that has corresponding receptacles for the battery cells. The insulating walls may be realized in such a way that an electrical contacting between a plurality of battery cells is prevented. In this way, short circuits are prevented that arise via the contact of the individual battery cells with one another. It is provided that the insulating walls can surround the respective battery cell essentially completely, the insulating walls extending in particular into the regions between the cladding surfaces. In addition, it is provided that the cell holder is made at least partly of a material that is thermally conductive and electrically insulating, so that heat that arises from the battery cells can be better dissipated.

Advantageously, in the region in which the contact arrangement contacts the battery cell, the battery cell is provided with a conductive and passivating paste in order to reduce a transition resistance between the contact arrangement and the battery cell.

In a particular embodiment of the present invention, in the region of the opening of the cell holder the battery cell has an insulating sheath, the contact arrangement being configured in the form of a contact blade, the contacting of the battery cell by the contact arrangement taking place by inserting the battery cell into the cell holder, the contact arrangement scoring the battery cell during the insertion in order to produce an electrical contacting.

Advantageously, the microcontroller is configured to carry out an individual voltage monitoring of the individual battery cells via the contact arrangement. In addition, the battery pack electronics can include a further series of additional electronic elements for controlling, regulating, or also recognizing the battery pack. In addition, further components, such as in particular switches, but also charge state indicators, can be connected to the circuit board of the battery pack electronics. Thus, in a particularly advantageous embodiment the cell carrier has at least one temperature sensor that can be connected to a battery cell, and may have a respective temperature sensor for each battery cell. Here, it can be provided that at least one temperature sensor is fastened on the cell holder, in particular being integrated directly into the cell holder and connected to the battery pack electronics. In addition, in a further embodiment of the present invention a thermal fuse can be provided that is connected to at least one temperature sensor and can be controlled for example via the battery pack electronics, and by which an overheating of individual battery cells is prevented. In addition, the cell carrier can have an additional current fuse that is connected to the microcontroller of the battery pack electronics and by which an overloading of individual battery cells, or all battery cells, is prevented.

With the aid of the described optimized realization of the battery pack according to the present invention, many functions within the battery pack are improved. In addition, various specific embodiments of a cell holder can be used in a battery pack, so that battery cells having different diameters and lengths can be accommodated, and the use of the cell holder in different battery packs can be ensured.

The use of a battery pack according to the present invention is space-saving, so that the constructive length and constructive width of the handheld power tool is determined to a lesser degree than was previously the case by the dimensions of the battery pack.

In addition, as battery cells in particular lithium-ion cells can be used, because in particular with the use of lithium-ion cells it is possible to combine a plurality of battery cells to form battery cell blocks in which a plurality of battery cells are connected in a parallel circuit. Here it is particularly advantageous that the cell holder can accommodate battery cells having different diameters and lengths, whereby the use of the cell holder, or cell carrier, in different battery packs can be ensured.

The battery pack according to the present invention can be detachably connected to a handheld power tool. Correspondingly, a handheld power tool, insofar as it is connected to a battery pack according to the present invention, also forms part of the subject matter of the present invention. The battery pack used in the handheld power tool is used here to drive the handheld power tool.

In general, in the context of the present application a handheld power tool is understood as referring to all handheld power tools having a tool carrier that can be set into rotation or translation directly, via a transmission, or via a planetary drive by a drive motor, such as screwdrivers, battery-operated drills, impact drills, multifunction tools, saws, shears, grinders, and/or drill screwdrivers. In the present context, transmission of electrical energy should be understood as meaning in particular that the handheld power tool is provided with energy via the battery pack.

Further features, possible uses, and advantages of the present invention result from the following description of the exemplary embodiments of the present invention shown in the Figures. It is to be noted that the presented features are only descriptive in character, and can also be used in combination with features of other developments described above, and are not intended to limit the present invention in any way.

In the following, the present invention is explained in more detail on the basis of the exemplary embodiments, identical reference characters being used for identical features.

DETAILED DESCRIPTION

Figure 1:
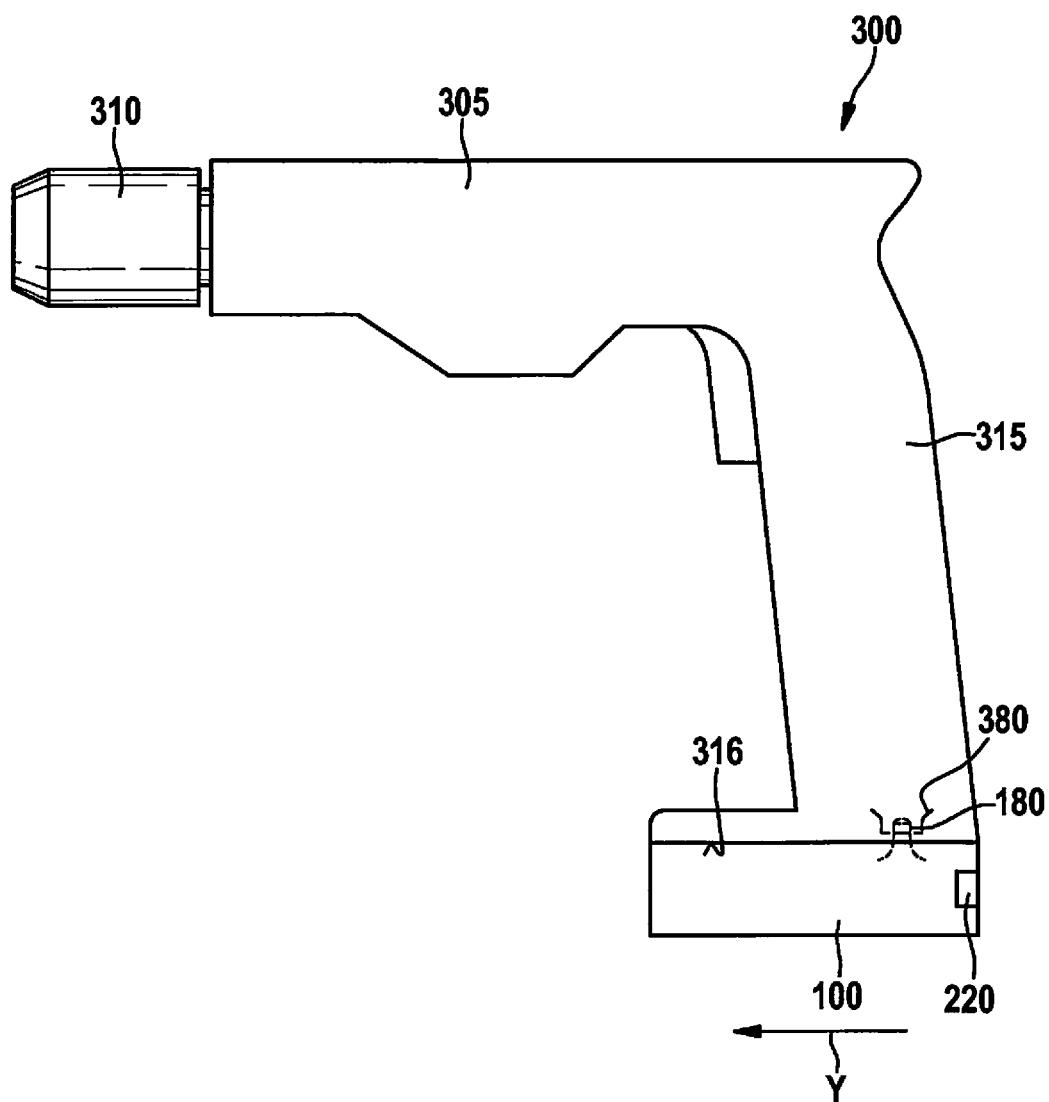
FIG. 1 shows an example of a view of a handheld power tool having a battery pack according to the present invention.
Figure 2:
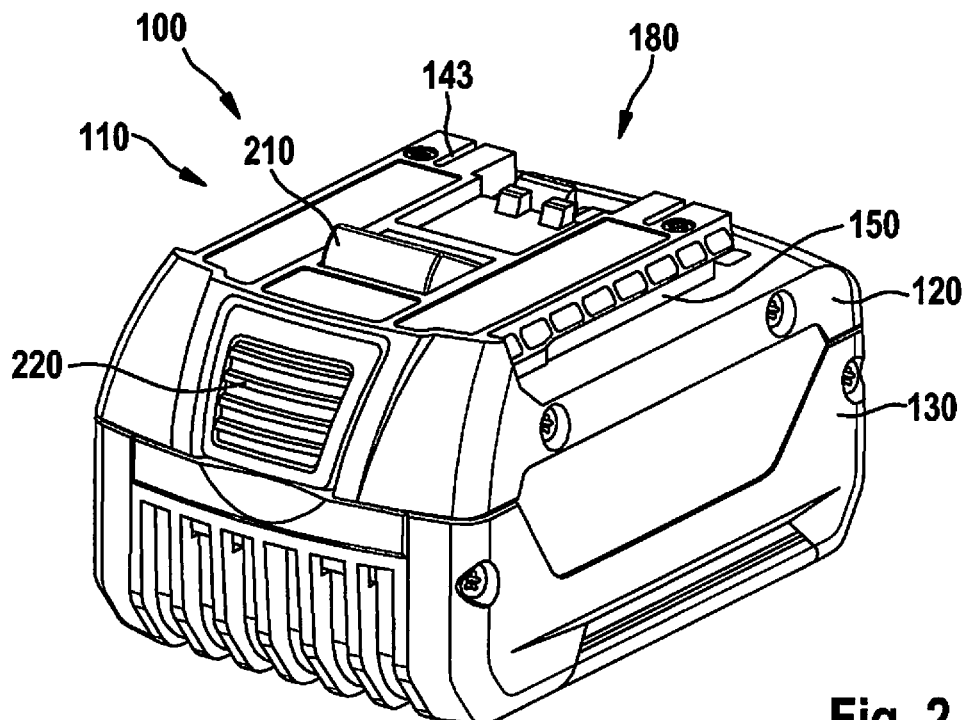
FIG. 2 shows a perspective view of a battery pack according to the present invention.

FIG. 1 shows an electrical device configured as a handheld power tool 300. According to the depicted specific embodiment, handheld power tool 300 can be mechanically and electrically connected to battery pack 100 for supplying power independent of the mains network. In FIG. 1, as an example handheld power tool 300 is realized as a battery-operated drill screwdriver. However, it is to be noted that the present invention is not limited to battery-operated drill screwdrivers, but rather can be used in various handheld power tools 300 operated with a battery pack 100. Handheld power tool 300 has a base body 305 on which a tool holder 320 is fastened, as well as a handle 315 having an interface 380 on which a corresponding interface 180 of a battery pack 100 according to the present invention is situated, here in a locked position. Battery pack 100 is configured as a sliding battery pack.

When battery pack 100 is attached to handheld power tool 300, receptacle arrangement provided on handheld power tool 300, e.g. guide grooves and guide ribs, are brought into engagement with corresponding guide elements 150 of battery pack 100, battery pack 100 being introduced along the receptacle arrangement of handle 315 in a sliding direction y, and battery pack 100 being pushed into the battery pack receptacle of a handheld power tool 300 along an outer surface 316 of handle 315, oriented essentially perpendicular to the longitudinal direction of handle 315. In the position shown in FIG. 1, battery pack 100 is fastened on handle 315 of handheld power tool 300 and is locked by locking arrangement. The locking arrangement includes a locking element and an actuating element 220. By actuation of actuating element 220, battery pack 100 can be detached from handle 315 of handheld power tool 300.

FIGS. 2 through 5 show a battery pack 100 according to the present invention for a handheld power tool 300. This power tool has a housing 110 made up of a first housing component 120 and a second housing component 130, the housing accommodating at least one, which may be (and shown here) a plurality of, battery cells 400 connected in parallel or in series between first housing component 120 and second housing component 130. Battery cells 400 may be positioned between the two housing components 120, 130 either by a cell holder 600 or by cardboard sleeves as insulating sheath 430 for the insulation of battery cells 400 from one another. In the depicted variant embodiment, battery pack 100 is realized as a sliding battery pack. Battery cells 400 may be positioned and held by a cell holder 600 for the insulation of battery cells 400 from one another in battery pack housing 110. In addition, for insulation from one another battery cells 400 can be provided with an insulating sheath 430 known from the existing art. As insulating sheath 430, cardboard sleeves or plastic sleeves, e.g. shrink tubes, can be provided. Insulating sheath 430 is further described below in connection with FIG. 6.

For the detachable attachment of battery pack 100 to a handheld power tool 300 or to a charge device, battery pack 100 has an interface 180 for detachable mechanical and electrical connection to a corresponding interface 380 of handheld power tool 300 or to a corresponding interface of the charge device. When attaching battery pack 100, receptacle arrangement 310, e.g. guide grooves and guide ribs, of handheld power tool 300 or of the charge device, for accommodating the corresponding guide elements 150 of battery pack 100 are brought into engagement therewith, battery pack 100 being introduced in a contacting direction y along receptacle arrangement 310, and interface 180 of battery pack 100 being pushed into the corresponding interface 380 of handheld power tool 300 or into the corresponding interface of the charge device. Via interfaces 180, 380, battery pack 100 can be allocated to handheld power tool 300 and/or to the charge device.

In order to lock battery pack 100 on handle 315, battery pack 100 is pushed along handle 315 in a sliding direction y, along a lower outer surface of handle 315 oriented essentially perpendicular to the longitudinal direction of handle 315. In the position shown in FIG. 1, battery pack 100 is locked on handle 315 by locking arrangement 200.

Locking arrangement 200 includes a locking element 210 (shown only schematically) and an actuating element 220. By actuation of actuating element 220, battery pack 100 can be detached from handle 315 of handheld power tool 300. After the unlocking of battery pack 100, this pack can be separated from handle 315 by pushing battery pack 100 opposite sliding direction y along a lower surface of handle 315. When attaching battery pack 100 on a handheld power tool 300, locking element 210 is brought into engagement with a corresponding receptacle (not shown in more detail) in handle 315 of handheld power tool 300.

Figure 3:
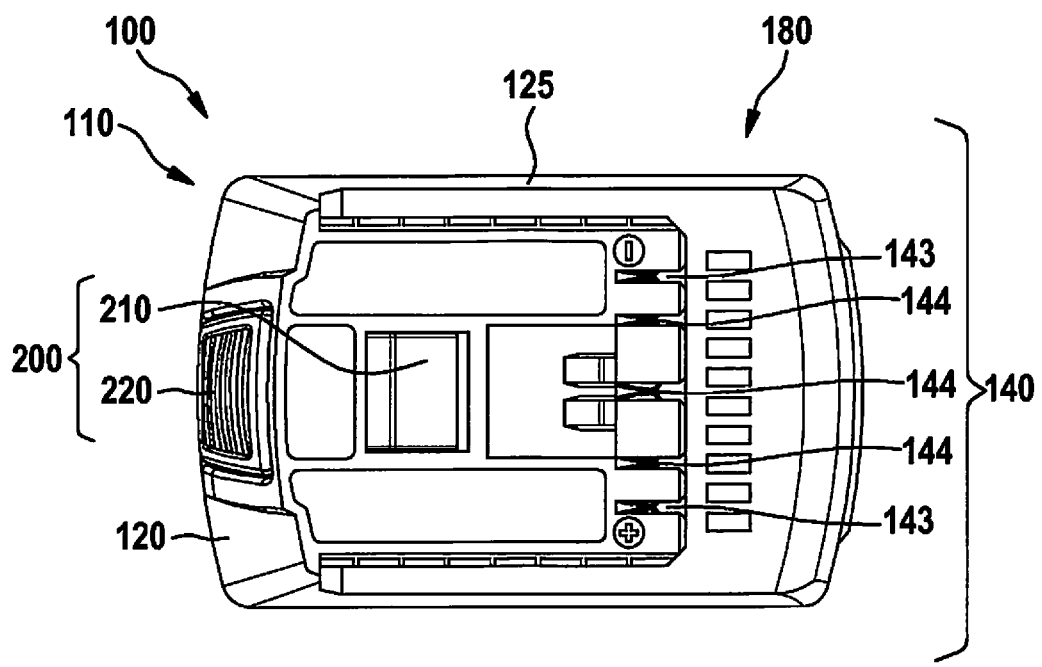
FIG. 3 shows a top view of the battery pack of FIG. 2.

Moreover, as can be seen in FIG. 3, interface 180 includes contact elements 140 for the electrical contacting of battery pack 100 with handheld power tool 300 or with the charge device. Contact elements 143 are configured as voltage contact elements, and act as charge contact elements and/or discharge contact elements. Contact elements 144 are configured as signal contact elements, and are used for signal transmission from battery pack 100 to handheld power tool 300 or to the charge device, and/or from handheld power tool 300 or from the charge device to battery pack 100.

Figure 4:
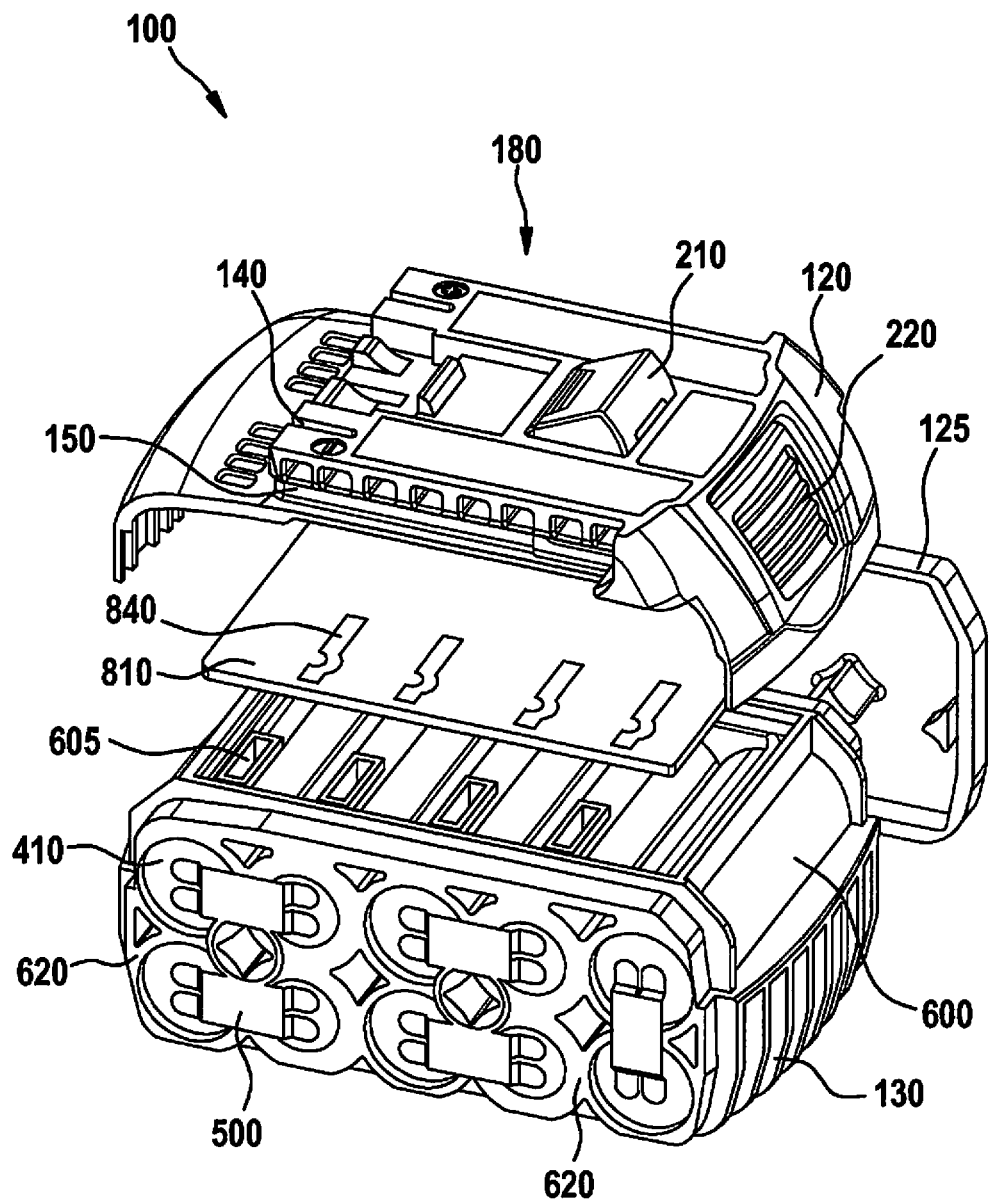
FIG. 4 shows a perspective exploded view of a first specific embodiment of a battery pack according to the present invention.

FIG. 4 shows a battery pack 100 in an exploded view. Here it can be seen clearly that battery pack housing 110 has a cell holder 600 having a plurality of battery cells 400 connected in a series circuit, second housing component 130 immediately forming cell holder 600. The connection of the battery cells among one another is realized via cell connectors 500. In addition, it can be seen that the individual battery cells 400 are accommodated at a distance from one another for mechanical fixing in cell holder 600. In addition to the fixing of battery cells 400 in battery pack housing 120, 130, cell holder 600 also acts to cool battery cells 400, and is made of a thermally conductive material, for example aluminum or a plastic. In addition, cell holder 600 has sleeve-type insulating walls 620, so that the individual battery cells 400 are separated, and an electrical insulation of the individual battery cells 400 from one another can be ensured. The heat transition resistance between adjacent battery cells 400, as well as between battery cells 400 and cell holder 600, is here as low as possible, so that the heat loss produced by battery cells 400 can be easily conducted outward, and overheating of the battery pack in its interior can be prevented. On the surface of cell holder 600, a circuit board 810 of a battery pack electronics is fastened inside battery pack housing 120, 130. In addition, the battery pack electronics includes contact elements 140 for producing the electrical and mechanical connection between battery pack 100 and handheld power tool 300, or between battery pack 100 and the charge device. The connection between the battery pack electronics and cell holder 600 is ensured by fastening elements not shown in more detail.

In the specific embodiment shown in FIG. 4, battery pack housing 110 has in addition two lateral components 125; only one of the two lateral components 125 is shown in FIG. 4. In the assembled state, lateral components 125 hold first housing component 120 and second housing component 130 together in such a way that a detachment of first housing component 120 from second housing component 130, or vice versa, is prevented. In the depicted specific embodiment, it can be clearly seen that cell holder 600 forms in some regions an outer side of second housing component 130 or of battery pack 100; alternatively, cell holder 600 can also form in some regions an outer side of first housing component 120.

In addition, in FIG. 4 contact arrangement 840 are shown that are attached on circuit board 810. In the depicted specific embodiment, contact arrangement 840 have the form of contact springs. In a manner not shown, contact arrangement 840 are connected to further electronic units situated on circuit board 810, for example a microcontroller (not shown), in order in this way to enable a monitoring and/or controlling of battery cells 400, for example an individual voltage monitoring of battery cells 400. Circuit board 810 is electrically connected, in a manner not shown, to contact elements 140.

In the depicted specific embodiment, cell holder 600 has openings 605 corresponding with contact arrangement 840, through which openings contact arrangement 840 contact battery cells 400.

Figure 5:
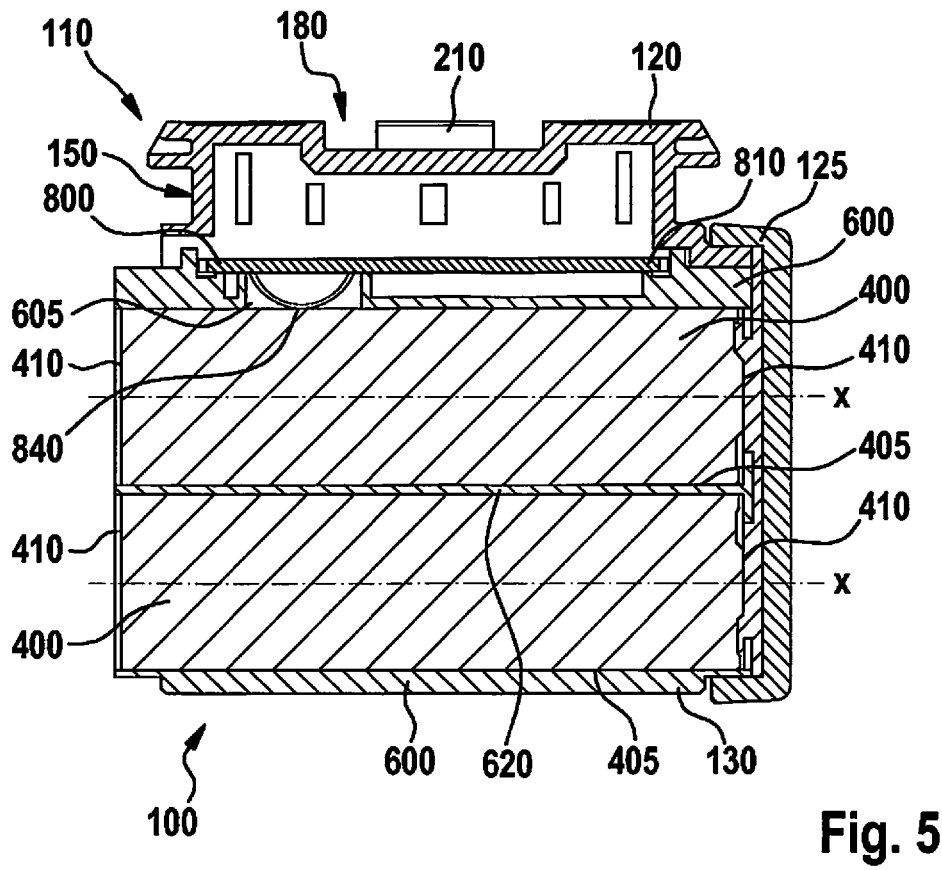
FIG. 5 shows a side view of the battery pack of FIG. 4.

The contacting of a battery cell 400 through a contact arrangement 840 is shown in FIG. 5, which shows a side view of battery pack 100 according to the present invention. It can be seen that the battery cell 400 at the top in FIG. 5, i.e. situated closer to circuit board 810, is insulated mechanically and electrically from circuit board 810 by a wall of cell holder 600, and that contact arrangement 840 contacts battery cell 400 through openings 605. In the specific embodiment shown, battery cell 400 has no insulating sheath 430 at least in the region of the contacting by contact arrangement 840. In a specific embodiment, the quality of the electrical contact can be increased in that cladding surface 405 of battery cell 400 is provided with a conductive and passivating paste in order to reduce a transition resistance between contact arrangement 840 and battery cell 400.

In addition, in FIG. 5 it can be seen that cladding surfaces 405 of two battery cells 400 situated alongside one another in cell holder 600 do not come into contact with each other, but rather are mechanically and electrically separated from each other by sleeve-type insulating walls 620.

Figure 6:
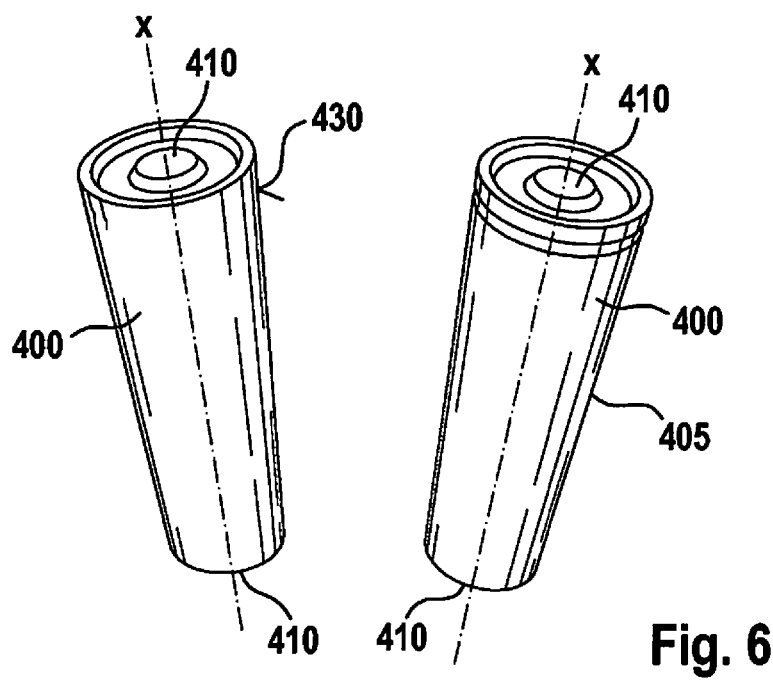
FIG. 6 shows a perspective view of two battery cells.

FIG. 6 shows, on the left side, a cylindrical battery cell 400 having an insulating sheath 430 known from the existing art, and shows on the right side a cylindrical battery cell 400 not having an insulating sheath 430, battery cells 400 each having a cladding surface 405 running parallel to a longitudinal axis x, the cladding surface being limited by two end faces 410 standing perpendicular to longitudinal axis x. Cladding surface 405 and end faces 410 form an outer shell of battery cell 400. On end faces 410 there are situated the electrical poles of battery cells 400 for electrical contacting. The outer shell of battery cells 400 is made of an electrically conductive material, in particular a metal, which may be aluminum. Insulating sheath 430 surrounds at least cladding surface 405 essentially completely. End faces 410, in particular the poles on end faces 410, are exposed in order to enable the electrical contacting. End faces 410, in particular the poles on end faces 410, do not have insulating sheath 430. Electrically non-conductive materials, e.g. paper, cardboard, plastic, are suitable as insulating sheath 430. Insulating sheath 430 forms in particular a thin sleeve lying closely on cladding surface 405.

Figure 7:
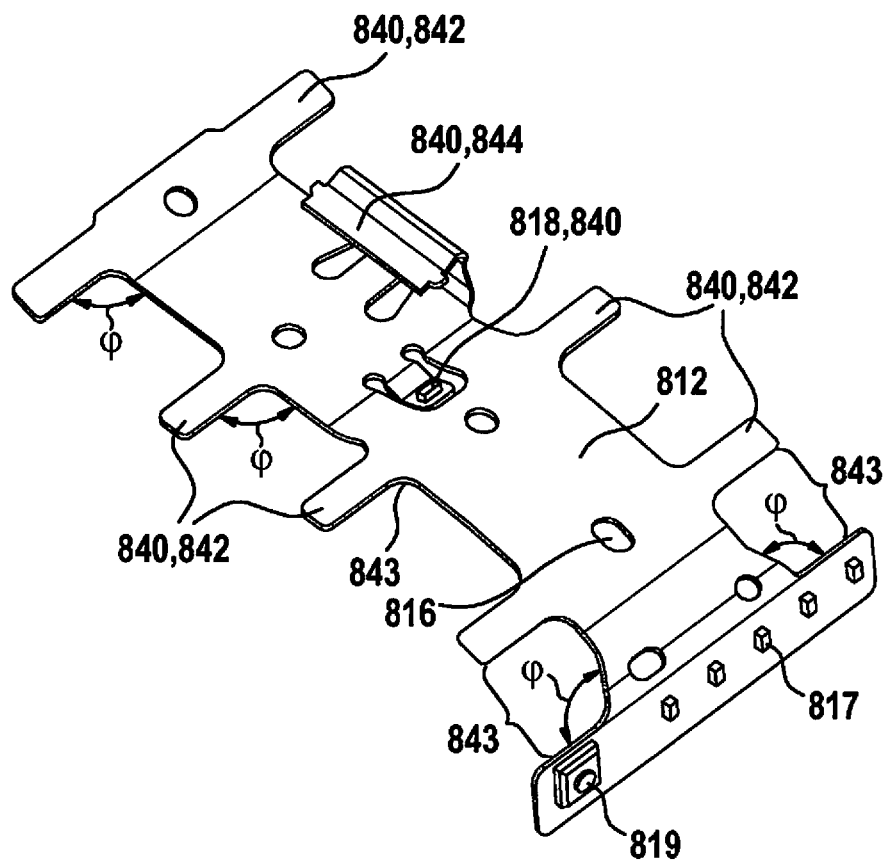
FIG. 7 shows a perspective view of a specific embodiment of a flexible circuit board.
Figure 8:
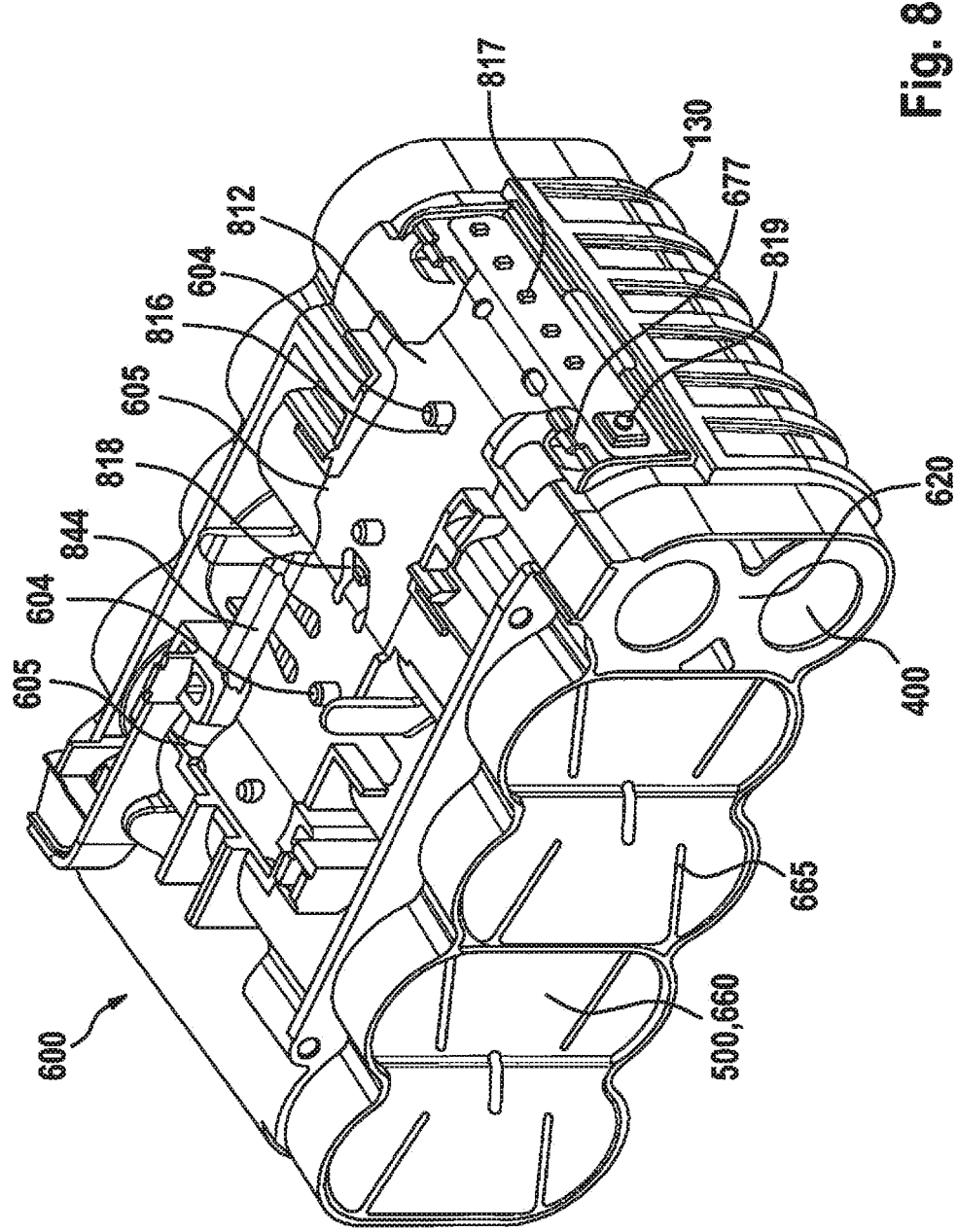
FIG. 8 shows a perspective view of a cell holder with the installed flexible circuit board of FIG. 7.
Figure 9:
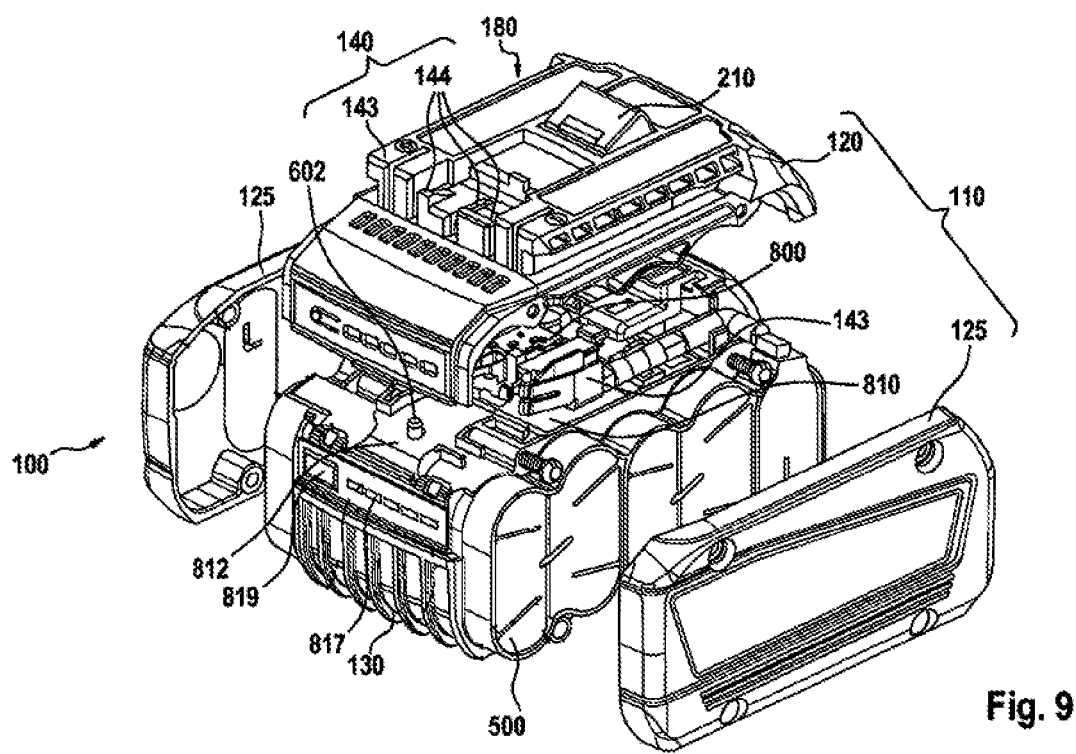
FIG. 9 shows a perspective exploded view of a second specific embodiment of a battery pack according to the present invention.

Battery pack electronics 800 has in addition a flexible circuit board 812, shown in particular in FIG. 7, having a plurality of contact arrangement 840 that are advantageously fastened on cell holder 600, as shown in FIGS. 8 and 9. Flexible circuit board 812 is either connected directly to the microcontroller (not shown) and/or is connected to circuit board 810 via a contact blade 844.

Flexible circuit board 812 has a bending rigidity that is realized, at least in some regions, such that a bending deformation of flexible circuit board 812 is possible at least in some regions in the mounted state. The flexible deformation of flexible circuit board 812 can take place in such a way that a midplane of circuit board 812 is deformed in each case in a region of the flexible deformation 843 by an angle φ relative to an original position. In this way, flexible circuit board 812 can be variably adapted to the geometrical shape of battery pack housing 110 or of cell holder 600, as can be seen in FIGS. 8 and 9. In order to ensure a positional securing of flexible circuit board 812 on cell holder 600, cell holder 600 has a plurality of positioning elements 604. In the mounted state, positioning elements 604 engage in corresponding openings 816 of flexible circuit board 812.

As is shown in particular in FIG. 7, flexible circuit board 812 has a plurality of contact arrangement 840 corresponding with battery cells 400, contact arrangement 840 advantageously being configured in the form of a flexible contact tongue 842, which may be in the form of two flexible contact tongues 842 situated opposite one another, which are inserted into corresponding openings 605 in cell holder 600, as shown in FIG. 8, and are configured to electrically contact a corresponding battery cell 400.

In addition, a plurality of different electrical components can be positioned on flexible circuit board 812 or on contact arrangement 840, these components being situated spatially separate from one another, such as various actuating elements 819, light displays 817, voltage taps, temperature sensors 818, various functional groups of battery pack electronics 800, antennas for a radio module, terminals for a wireless charge module, and/or other surface-mounted devices. Surface mounted devices (SMD) make it possible to increase the equipping density on a circuit board 810, 812, and to expand it to almost any desired extent, e.g. with a connection of an inductive charge module with additional current and signal lines. Thus, through the present invention the complexity of the cabling and/or the number of solder connections inside the battery pack housing 110 can be reduced, reducing assembly outlay and thus costs, and making battery pack 100 more robust and longer-lived.

FIG. 9 shows a second specific embodiment of a battery pack 100 according to the present invention in an exploded view. In the depicted specific embodiment it can be seen that inside battery pack housing 110, circuit board 810 with battery pack electronics 800 is fastened on the surface of cell holder 600. On circuit board 810 there are situated contact elements 144 for producing the electrical and mechanical connection between battery pack 100 and handheld power tool 300, or between battery pack 100 and the charge device. Here, contact elements 143 are configured as voltage contact elements, and contact elements 144 are configured as signal contact elements. In addition, it can be seen that battery pack 100 has flexible circuit board 812, shown in particular in FIG. 7, having a plurality of contact arrangement 840 that electrically contact corresponding battery cells 400 in cell holder 600. In this way, the contacting of the individual battery cells 400 with battery pack electronics 800 via additional current conductors can be omitted.

Figure 10:
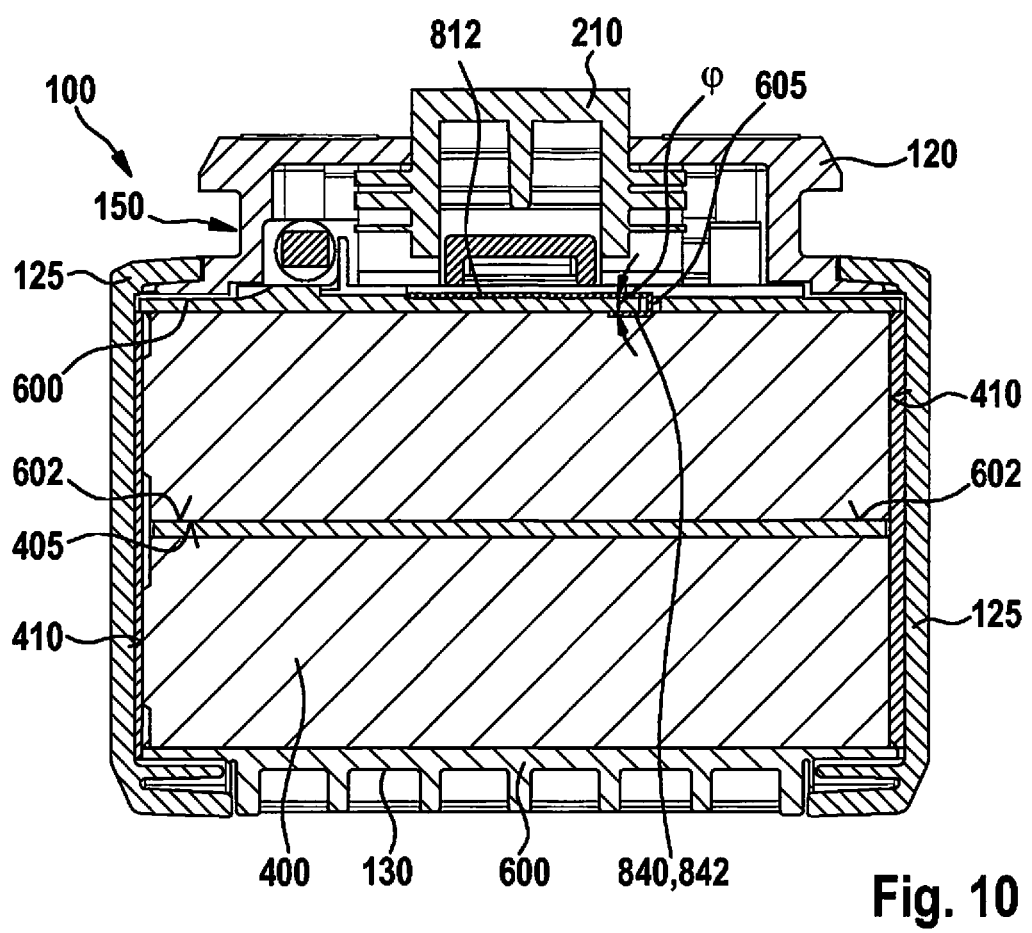
FIG. 10 shows a side view of the second specific embodiment of FIG. 9.

As FIG. 10 shows in detail, cell holder 600 has, in the region of the cell channel 402 for each battery cell 400, an opening 605 that corresponds with contact arrangement 840, through which the respective contact arrangement 840 can be introduced into cell channel 402 in order to contact battery cell 400. Contact tongues 842 are introduced into openings 605 of cell holder 600 in a cell channel 402 with the aid of a tool. Contact tongues 842 are in addition deformed, during the introduction of battery cells 400, by the angle φ relative to an original position. After the introduction of battery cells 400 into the cell channel, contact arrangement 840 is clamped between insulating wall 620 of cell channel 602 and battery cell 400; alternatively, contact arrangement 840 or contact tongues 842 can be welded or soldered onto battery cells 400 for the electrical contacting.

After the introduction of battery cells 400 has taken place, the angle φ has a value of about 180°, a value between 10° and 200°, and which may be between 30° and 190°, also being possible. In this way, contact arrangement 840 contact battery cells 400, so that the individual battery cells 400 are electrically connected directly to flexible circuit board 812 via contact arrangement 840, or contact tongues 842. In the specific embodiment shown in FIGS. 8 and 9, when battery cells 400 are introduced into cell channel 402 an equal tension in both directions on flexible circuit board 812 arises due to the two contact arrangement 840 of flexible circuit board 812 situated opposite one another.

In a specific embodiment, the quality of the electrical contact can be increased in that the battery cells 400 have essentially no insulating sheath, or have an insulating sheath only in some regions, the insulating sheath having at least one opening at least in the region in which contact arrangement 840 contact battery cells 400; here, in order to reduce a transition resistance between contact arrangement 840 and battery cell 400, the battery cell 400 can be provided with a conductive and passivating paste.

In addition to the specific embodiments described and depicted, further specific embodiments are conceivable that may include further modifications as well as combinations of features.

What is claimed is:

1. A battery pack for a handheld power tool, comprising:
   a cell holder that accommodates at least one battery cell, the battery cell having a cladding surface that runs parallel to a longitudinal axis, the cladding surface being limited by two end faces standing essentially perpendicular to the longitudinal axis, and the cladding surface and the end faces forming an outer shell of the battery cell;
   a battery pack electronics, the battery pack electronics including a first circuit board having contact elements for producing an electrical connection between the battery pack and the handheld power tool; and
   at least one contact arrangement corresponding to the battery cell, the contact arrangement electrically contacting the corresponding battery cell at the cladding surface,
   wherein the at least one contact arrangement corresponding to the battery cell is situated on a second circuit board.

2. The battery pack of claim 1, wherein the second circuit board is a flexible circuit board.

3. The battery pack of claim 1, wherein the at least one battery cell essentially has no insulating sheath.

4. The battery pack of claim 1, wherein the contact arrangement is configured in the form of a contact spring and/or a contact blade.

5. The battery pack of claim 1, wherein the at least one battery cell has in some regions an insulating sheath, the insulating sheath adjoining the end faces and/or the regions of the cladding surfaces.

6. The battery pack of claim 1, wherein the battery cell has an insulating sheath, the insulating sheath having at least one opening at least in a region in which the contact arrangement contacts the battery cell.

7. The battery pack of claim 1, wherein the battery cell includes a conductive and passivating paste in a region in which the contact arrangement contact the battery cell, for the reduction of a transition resistance between the contact arrangement and the battery cell.

8. The battery pack of claim 1, wherein the battery pack electronics includes a microcontroller, the microcontroller being electrically connected to the contact arrangement and being configured to acquire at least one operating parameter of the individual battery cell via the at least one contact arrangement.

9. The battery pack of claim 8, wherein the microcontroller is configured to carry out an individual voltage monitoring of the individual battery cells via the contact arrangement.

10. The battery pack of claim 1, wherein the cell holder has sleeve-type insulating walls corresponding to the battery cell, the insulating walls having at least one opening at least in regions in which the contact arrangement contact the battery cell.

11. The battery pack of claim 10, wherein the insulating walls essentially completely surround the respective battery cells.

12. The battery pack of claim 10,
wherein the at least one battery cell comprises at least two battery cells,
wherein the insulating walls are realized so that an electrical contacting between the at least two battery cells is prevented.

13. The battery pack of claim 10, wherein the battery cell has an insulating sheath in the region of the opening of the cell holder, the contact arrangement being configured in the form of a contact blade, the contacting of the battery cell by the contact arrangement taking place through insertion of the battery cell into the cell holder, the contact arrangement scoring the battery cell during the insertion in order to produce an electrical contact.

14. A handheld power tool, comprising:
a power tool;
an electric motor; and
a battery pack, which is connected or disconnected from the power tool in an attachable or detachable manner, the battery pack being connected electrically to the handheld power tool in an installed state;
wherein the battery pack includes:
a cell holder that accommodates at least one battery cell, the battery cell having a cladding surface that runs parallel to a longitudinal axis, the cladding surface being limited by two end faces standing essentially perpendicular to the longitudinal axis, and the cladding surface and the end faces forming an outer shell of the battery cell; and
a battery pack electronics, the battery pack electronics including a first circuit board having contact elements for producing an electrical connection between the battery pack and the handheld power tool; and
at least one contact arrangement corresponding to the battery cell, the contact arrangement electrically contacting the corresponding battery cell at the cladding surface,
wherein the at least one contact arrangement corresponding to the battery cell is situated on a second circuit board.

15. The battery pack of claim 1, wherein the second circuit board is a flexible circuit board.

16. The battery pack of claim 1, wherein the contact arrangement is configured in the form of a contact spring and/or a contact blade, which includes an insulation displacement terminal contact.

17. The battery pack of claim 10, wherein the insulating walls essentially completely surround the respective battery cell, the insulating walls extending into regions between the cladding surfaces.

* * * * *